United States Patent [19]

LeBeau

[11] Patent Number: 5,615,851
[45] Date of Patent: Apr. 1, 1997

[54] WIRE HARNESS ATTACHMENT CLIP

[75] Inventor: Howard S. LeBeau, Shelby Township, Mich.

[73] Assignee: Yazaki Corporation, Tokyo, Japan

[21] Appl. No.: 553,837

[22] Filed: Nov. 6, 1995

[51] Int. Cl.⁶ .................................................. A47F 5/00
[52] U.S. Cl. ............................................................ 248/73
[58] Field of Search ........................ 248/71, 73; 411/60, 411/45, 41, 354

[56] References Cited

U.S. PATENT DOCUMENTS

| | | | |
|---|---|---|---|
| 3,650,173 | 3/1972 | Mathe | 411/45 |
| 3,709,088 | 1/1973 | Pitzer | 411/354 X |
| 4,114,509 | 9/1978 | Poe | 411/60 |
| 4,386,752 | 6/1983 | Pavlak et al. | 248/73 |
| 4,405,272 | 9/1983 | Wollar | 411/45 X |

FOREIGN PATENT DOCUMENTS

| | | | |
|---|---|---|---|
| 2118418 | 9/1990 | Japan . | |
| 1299592 | 12/1972 | United Kingdom | 248/71 |

*Primary Examiner*—Alvin C. Chin-Shue
*Assistant Examiner*—Sarah L. Purol
*Attorney, Agent, or Firm*—Young & Basile, P.C.

[57] ABSTRACT

A clip for securing a wire harness to a vehicle panel. The clip comprises a tower having a flange for embracing the harness and a hollow cylindrical member extending downwardly from the flange for insertion through an aperture in the harness. Retention legs extend through the cylindrical member and a lever base integral with the flange pivotally supports an operating lever. A piston is positioned slidably between the legs and the legs and piston are connected to the lever via an eccentric mechanism. In operation, the legs are inserted through an aperture in the vehicle panel and the operating lever is pivoted. The eccentric mechanism drives the piston downwardly relative to the legs to separate the legs and cause them to move outwardly into engagement with the aperture in the vehicle panel. Simultaneously, the legs are moved axially in a shortening direction to bring head structures on the free ends of the legs into contact with the remote face of the vehicle panel, whereafter the lever is latched to the lever base.

19 Claims, 6 Drawing Sheets

FIG-12

WIRE HARNESS ATTACHMENT CLIP

BACKGROUND OF THE INVENTION

This invention relates to attachment clips and more particularly to an attached clip especially suitable for use in attaching a vehicular wire harness to a panel of the vehicle.

In the automotive arts electrical conductors are commonly bundled into wire harnesses. These wire harnesses extend throughout the vehicle to power various systems. At certain locations in the vehicle, the wire harnesses need to be supported on a vehicle panel, usually a piece of sheet metal. Clips or other types of fasteners are used for this purpose. The sheet metal, and the apertures (for receiving the clips) in the sheet metal, have to be stamped and cut to thicknesses and specifications which allow the clips to be easily and reliably secured to the panels.

Prior art clips, for example like the ones described in U.S. Pat. No. 4,386,752 or Japanese Patent 2-118418, require high insertion force. They also require that the mechanisms for operating and locking the clips be off-set from the insertion direction of the clip so that the insertion force can be applied without interference from, and without breaking, the locking mechanisms. In the confined spaces of engine compartments, and in other tight areas of the vehicle, it is sometimes difficult or impossible to provide the needed force to insert clip legs in the vehicle panel. Hand room for locking the clip around the wire harness is usually restricted.

The clip legs are typically of the type which must be compressed together as they are squeezed though the vehicle panel apertures. The clip legs must be larger than the aperture to provide interference, and thus retention, after the clip legs are inserted through the aperture. If the aperture is too small (outside of the tolerances allowed), very great insertion force is needed, which could lead to deformation or breaking of the clip and possible injury to the assembler. Additionally, the clip often needs structure in addition to the clip legs to prevent the clip and harness from moving along the surface of the panel.

Further, the prior art clips typically are very difficult to remove after insertion and are therefore, as a practical matter, not reusable; the prior art clips typically do not include any visual indication that the clip is fully locked; and the prior art clips are extremely sensitive to tolerance variations with respect to the panel thickness.

SUMMARY OF THE INVENTION

This invention is directed to the provision of an improved attachment clip for wire harnesses.

More particularly, this invention is directed to the provision of a clip for attaching a wire harness to a panel which provides a low insertion force into a panel aperture and yet a high retention force; that is reusable; that readily accommodates variations in the panel aperture diameter and panel thickness; that provides a visual indication that the clip is fully locked; and that provides a separation of the harness attachment action and the panel attachment action.

The invention relates to an attachment clip including a body structure for engaging the wire harness to position the harness proximate one side face of the panel and an elongated leg assembly extending beyond the body structure by an effective length and adapted to be passed through an aperture in the panel to dispose a head structure on the free end of the leg assembly proximate the other side face of the panel.

According to the invention, the leg assembly has a relaxed diameter dimension and a relaxed effective length dimension allowing the leg assembly to pass readily through the panel aperture to dispose the leg assembly head structure proximate the other side face of the panel and the clip includes locking means carried by the body structure and operative when actuated to vary one of the leg assembly dimensions in a sense to lock the leg assembly to the panel. This arrangement allows the leg assembly to be passed readily through the panel aperture so as to provide a low insertion force and allows the leg assembly to be thereafter dimensionally altered to lock the leg assembly to the panel.

According to a further feature of the invention, the locking means is operative when actuated to increase the diameter of the leg assembly so as to expand the leg assembly into locking engagement with the panel aperture. This arrangement positively locks the leg assembly within the aperture so as to preclude movement of the clip and the associated wire harness relative to the panel.

According to a further feature of the invention, the locking means is operative when actuated to decrease the effective length of the leg assembly so as to draw the head structure of the leg assembly against the other side face of the panel. This arrangement locks the clip against the side face of the panel remote from the wire harness and firmly secures the wire harness to the panel.

According to a further feature of the invention, the leg assembly includes a plurality of legs spaced circumferentially about a central axis, a piston mounted within the legs for movement along the central axis, and coacting means on the piston and on the legs operative to vary the diameter of the leg assembly in response to relative axial movement between the piston and the legs, and the locking means is operative when actuated to generate relative axial movement between the piston and the legs so as to increase the diameter of the leg assembly. This arrangement provides a simple and effective means of generating the desired diameter increase of the leg assembly so as to lock the leg assembly within the panel aperture.

According to a further feature of the invention, the locking means includes a lever and eccentric means operative in response to pivotal movement of the lever to generate relative axial movement between the piston and the legs. This arrangement provides a simple and effective means of increasing the diameter of the leg assembly to firmly engage within the panel aperture while simultaneously decreasing the effective length of the leg assembly so as to draw the head structure of the leg assembly against the remote face of the panel.

According to a further feature of the invention, the lever is mounted for movement between a locked position and an unlocked position, and the clip further includes latch means operative to retain the lever in its locked position. This arrangement allows the clip to be maintained in a locked position after the panel has been firmly engaged by the clip.

In the disclosed embodiments of the invention, the body structure includes a flange for embracing the wire harness and a hollow tower member extending from the flange; the tower passes through a suitable opening in the wire harness; the clip legs pass through the tower member for passage through the panel aperture after passing through the wire harness; and the locking means includes a lever pivotally mounted on the body structure, a lever base formed rigid with the body structure, and coacting latch means on the lever and on the lever base operative to maintain the lever in a locked position.

DETAILED DESCRIPTION OF THE PREFERRED EMBODIMENT

The invention attachment clip is especially usable in a vehicular under-hood environment, specifically for attaching a wire harness 11 to a vehicle panel 12 utilizing a panel aperture 12a. Wire harness 11 will be understood to include a plurality of electrical conductors 13 bundled into a harness sheath 14 and including apertures 11a passing through the harness.

The attachment clip 10 of the first embodiment (FIGS. 1–9) includes a body structure 16, a locking assembly 18, and a leg assembly 20.

The entire clip is preferably formed of a suitable plastic material in suitable molding operations.

Body structure 16 includes a flange structure 16a and a tower structure 16b.

Flange structure 16a has an inverted U-configuration and includes a top wall 16c and angled side walls or wings 16d. It will be understood that flange 16a is sized and configured so as to embrace a wire harness 11 to position the harness adjacent panel 12.

Tower 16b extends downwardly from the top wall 16c of flange 16a and has a hollow cylindrical cross-sectional configuration. Tower structure 16b includes an open lower end 16e and an open upper end 16f communicating with a suitable aperture 16g in upper flange wall 16c.

Lock assembly 18 includes a lever base 22 and a lever 24.

Lever base 22 is formed integrally with the top wall 16c of flange structure 16a and extends in cantilever fashion from top wall 16c to define a free end 22a remote from the flange structure. Lever base 22 further includes latch towers 22b extending upwardly from the lever base at opposite sides of the lever base proximate free end 22a and defining latch serrations 22c.

Lever 24 includes a main body plate-like portion 24a and an enlarged lower portion 24b. Lever 24 is pivotally mounted relative to body structure 16 by trunions 24c formed in enlarged lower lever portion 24b and journalled in upstanding lugs 22d formed integrally with lever base 22.

Figure 1:
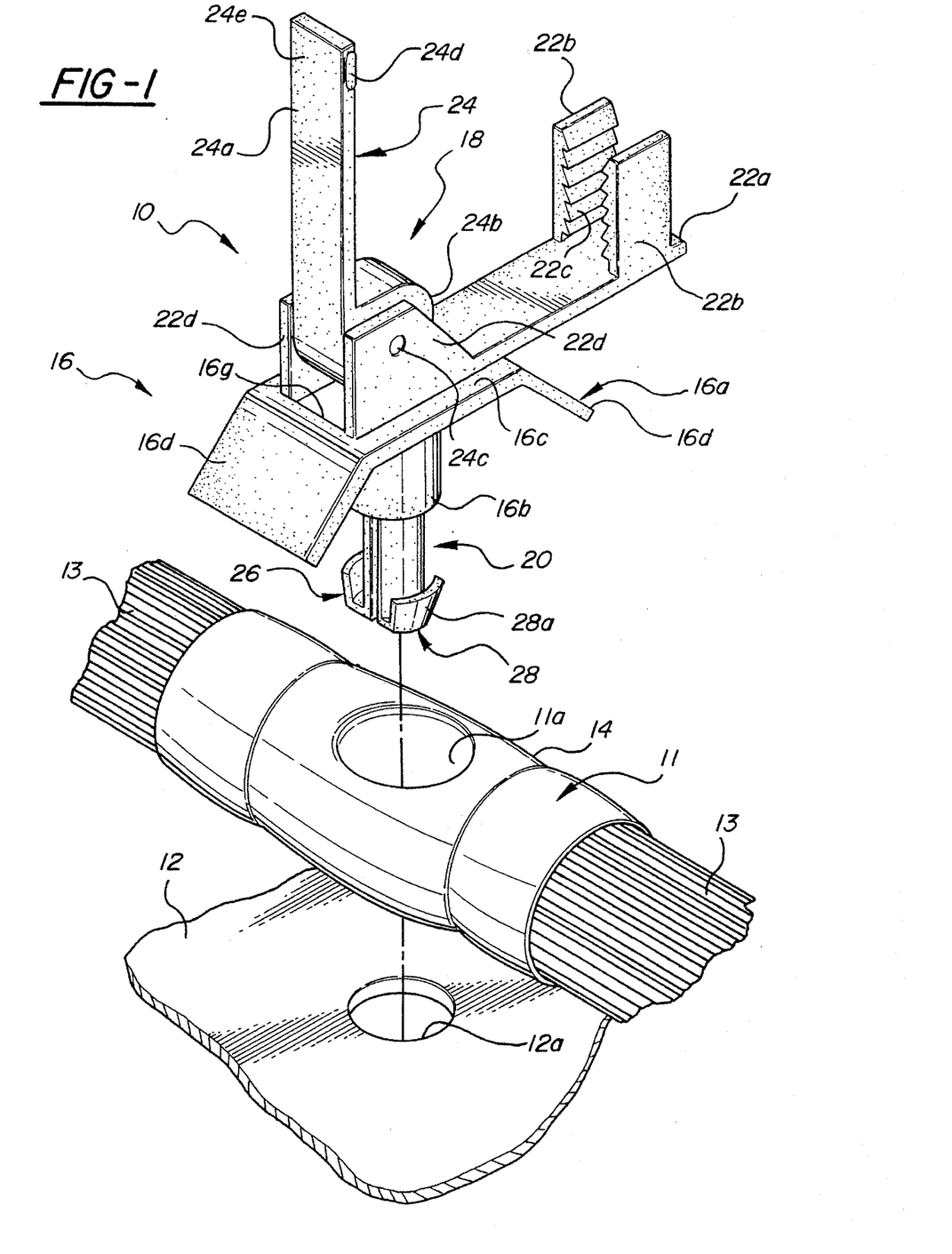
FIG. 1 is a perspective exploded view of an attachment clip according to a first embodiment of the invention shown in association with a wire harness and a panel.
Figure 2:
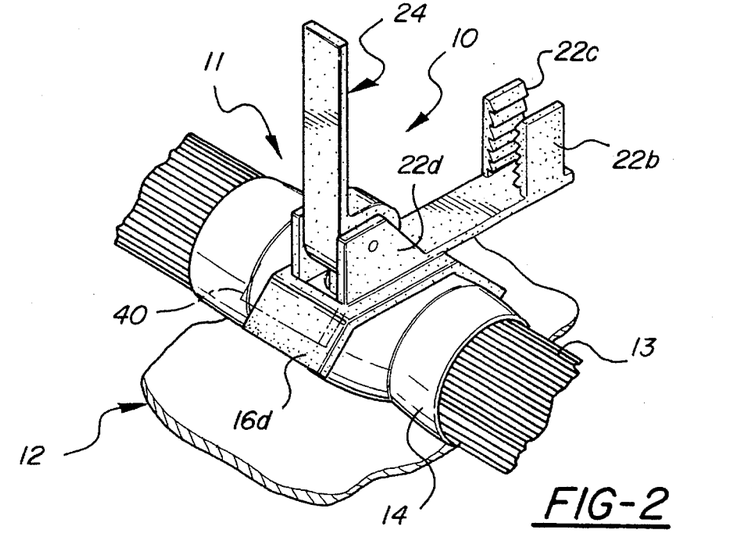
FIG. 2 is a perspective view showing the attachment clip in use to secure a wire harness to a panel.
Figure 3:
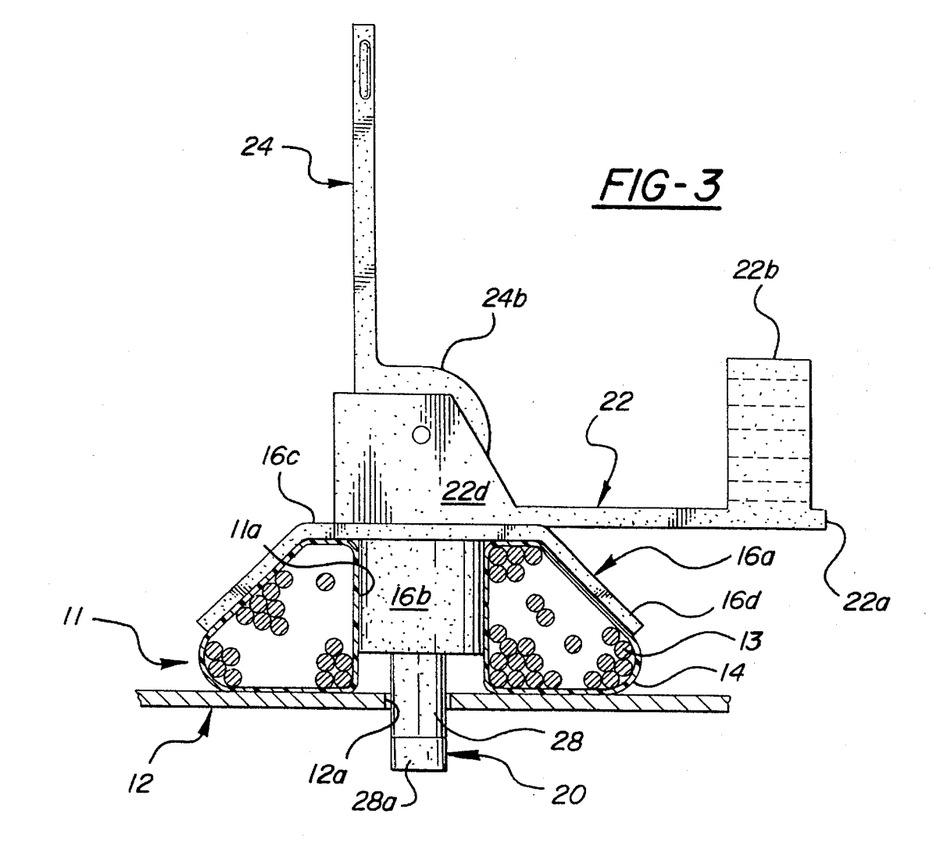
FIG. 3 is a cross-sectional view through the wire harness showing the relationship of the attachment clip to the wire harness with the wire harness positioned against the panel by the attachment clip.
Figure 4:
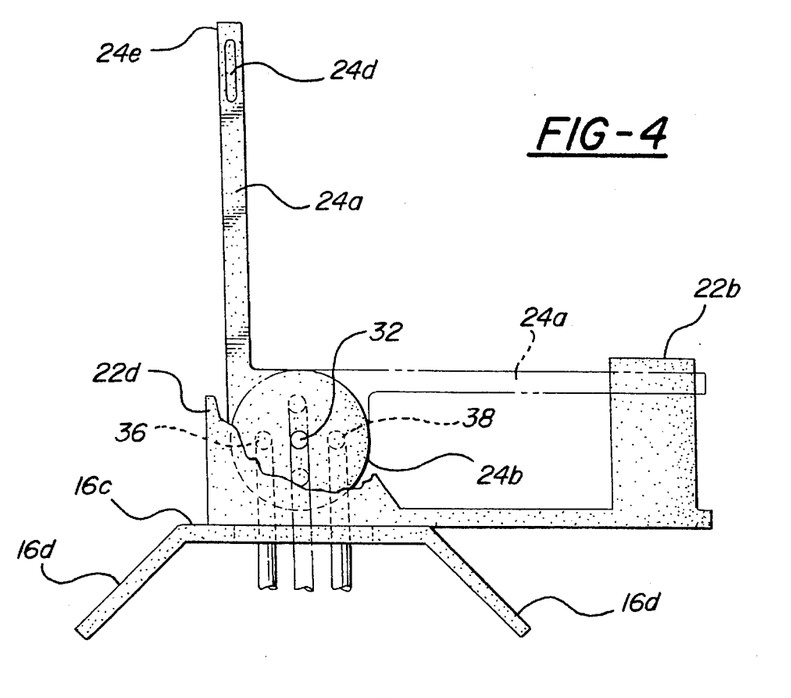
FIG. 4 is a somewhat schematic side elevational view of the attachment clip.
Figure 5:
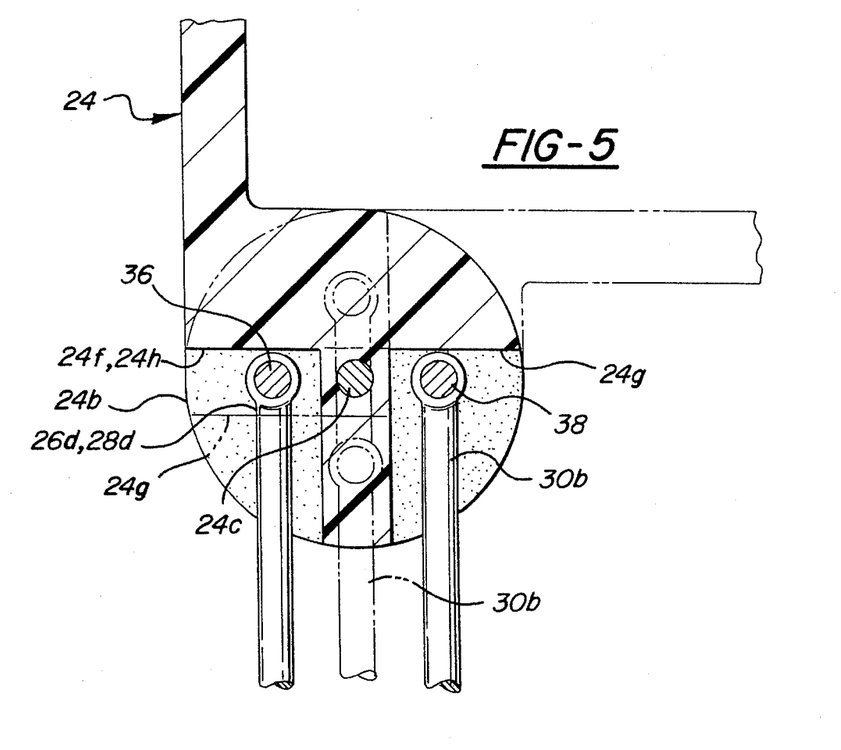
FIG. 5 is a detail view of a portion of the attachment clip.

Lever 24 is thus mounted for pivotal movement on body structure about an axis 25 between an upstanding unlocked position seen in solid lines in FIGS. 1 and 4 and a lowered locked position seen in dash lines in FIGS. 4 and 5 in which a pair of latch ridges or fingers 24d formed on opposite side edges of the lever proximate the free end 24e of the lever latchingly coact with selected serrations 22c defined by the latch towers 22b to latch the lever in any one of the selected positions defined by the serrations of the latch towers.

Leg assembly 20 is positioned slidably within tower 16b and includes a pair of legs 26, 28 and a piston 30.

Figure 8:
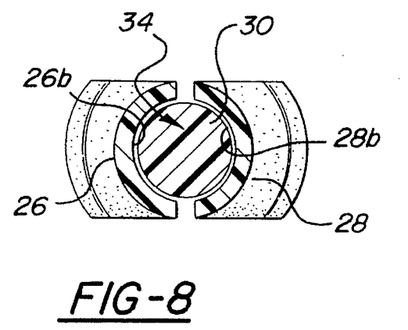
FIGS. 8 and 9 are cross-sectional views taken, respectively, on lines 8—8 and 9—9 of FIG. 6.
Figure 9:
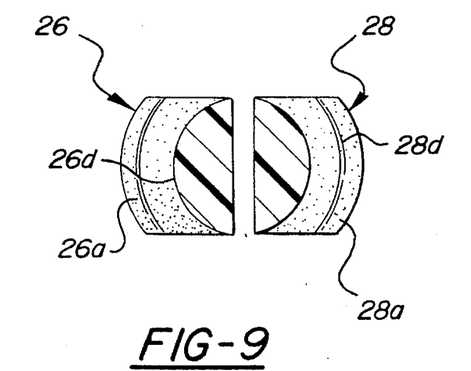

Piston 30 is mounted for movement generally along a central axis 32 orthogonal with respect to pivot axis 25 and legs 26, 28 are circumferentially spaced in surrounding relation to piston 30 and to axis 32. The lower ends of the legs 26, 28 (FIG. 9) are generally solid and coact to define a generally circular cross-sectional configuration and head structures 26a, 28a are provided at the extreme lower ends of the legs for coaction with the panel 12. The central portions of the legs are hollowed out as seen in FIG. 8 and define arcuate surfaces 26b, 28b which coact to define an axially extending bore 34 for slidable receipt of piston 30. The lower ends of arcuate surfaces 26b, 28b are angled inwardly toward axis 32 so as to define cam surfaces 26c, 28c for camming coaction with the lower end 30a of piston 30. The upper ends 26d, 28d of the legs 26, 28 and the upper end 30b of the piston are mounted to the enlarged lower portion 24b of the lever 24 in a manner to create an eccentric action as between the lever and the leg assembly whereby downward pivotal movement of the lever about axis 25 has the effect of moving piston 30 downwardly along axis 32 and moving legs 26, 28 upwardly along axis 32.

Specifically, the upper ends 26d, 28d of legs 26, 28 are slidably mounted on a cross pin 36 extending through lever lower portion 24b in eccentric relation with respect to pivot axis 25 so as to constitute in effect a crank arm and the upper end 30b of piston 30 is mounted on a pin 38 which is eccentric with respect to axis 32 but on the opposite side of axis 32 from pin 36. It will be seen that pivotal movement of lever 24 from its solid line or unlocked position of FIG. 1 to its lowered dash line position of FIGS. 4 and 5, by virtue of the eccentricity of the pins 36 and 38 relative to pivot axis 32, has the effect of moving piston 30 downwardly along axis 32 and pulling arms 26, 28 upwardly along axis 32 so as to generate relative axial movement as between the piston and the legs.

Figure 6:
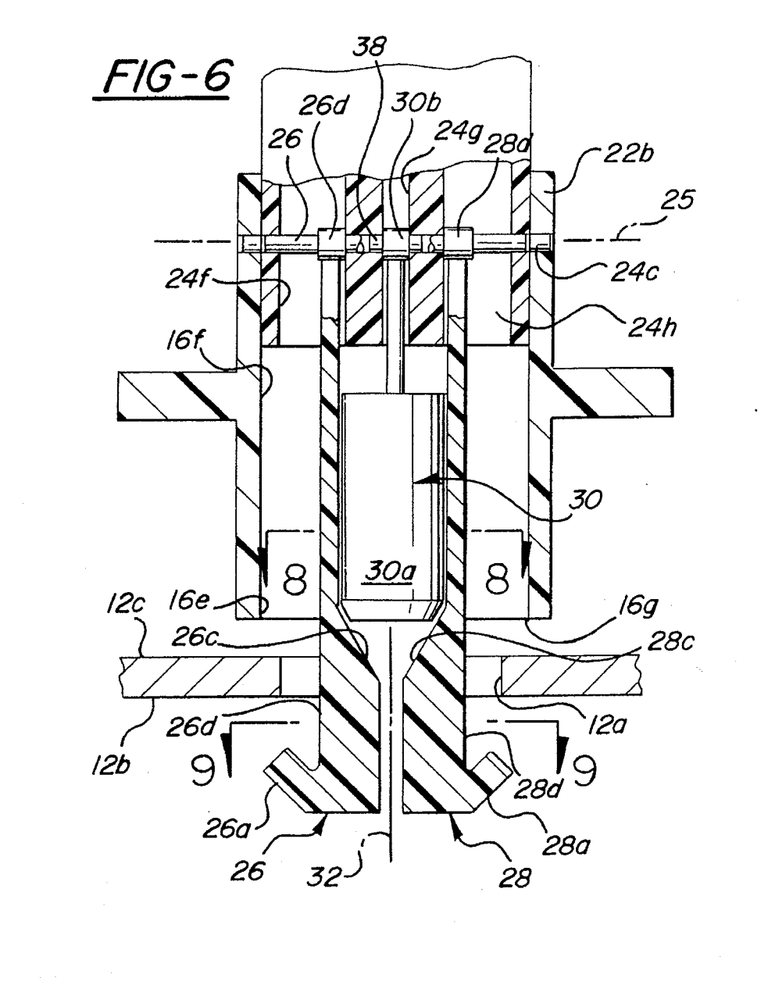
FIGS. 6 and 7 are sequential views showing the manner in which the attachment clip attaches to an associated panel to secure the wire harness to the panel.
Figure 7:
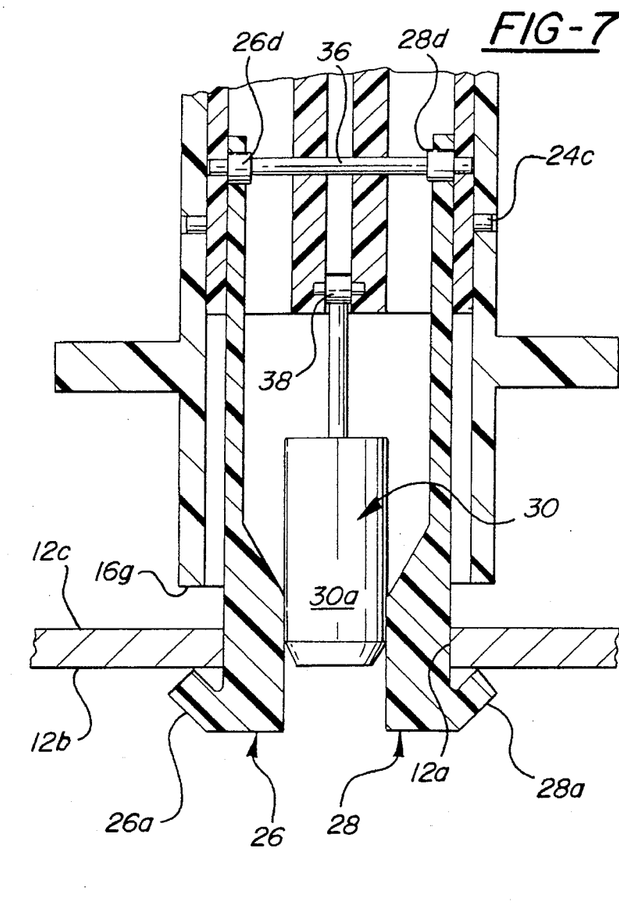

As the piston 30 moves downwardly as viewed in FIG. 6 and the arms 26, 28 move upwardly as viewed in FIG. 6, the effective length of the leg assembly (i.e., the length by which the leg assembly projects downwardly beyond the lower end 16g of tower 16b) is reduced and the diameter of the leg assembly is increased.

The diametric increase of the leg assembly is caused by the engagement of the lower end 30a of the piston with the cam surfaces 26c, 28c of the legs so that the piston is cammingly inserted between the solid lower ends of the legs to force the legs apart and force the outer leg circumferences 26d, 28d into tight clamping and expanding engagement with the circular wall surface of panel aperture 12a while, simultaneously, the head structure 26a, 28a of the legs is being drawn upwardly into clamping engagement with the lower or remote face 12b of the panel.

In use, and with lever 24 in a raised or unlocked position, leg assembly 20 and tower 16b are passed downwardly through harness aperture 11a to position flange 16a in embracing relation to wire harness and position the tower within the harness aperture with the leg assembly projecting beyond the lower end of the tower and beyond the lower surface of the harness. If desired, a strip of adhesive tape 40 may be utilized to tape flange 16a to the harness. The projecting lower end of the leg assembly is now passed readily through panel aperture 12a to position the head structure 26a, 28a beneath the lower or remote face 12b of the panel. Lever 24 is now pivoted downwardly. The eccentric action of the pivoting lever has the effect of increasing the diameter of the leg assembly, whereby to expand the leg assembly into engagement with panel aperture 12a, while simultaneously decreasing the effective length of the leg assembly, whereby to draw the head structure of the leg assembly against the lower face 12b of the panel. The attachment clip thus functions to hold the harness 11 tightly against the near face 12c of the panel proximate aperture 12a by the combined expanding action of the leg assembly against the circumferential surface of aperture 12a and the clamping action of the head portions of the leg assembly against the undersurface of the panel so that the harness is held firmly against and proximate to the panel.

The parameters of the various members may be selected such that the lower annular edge 16g of the tower moves into engagement with the near face 12c of the panel 12 as the head structure 26a, 28a moves into engagement with the remote face 12b of the panel or, as shown, the parameters may be selected such that the lower edge 16g of the tower is spaced from the panel surface 12c in the final configuration of the wire harness, the panel, and the attachment clip.

The extent by which the effective length of the leg assembly is decreased during the locking action of the attachment clip may be varied by selective variation of the serrations 22c with which latch ridges 24d are engaged and the extent to which the diameter of the leg assembly is expanded for coaction with aperture 12a may likewise be varied by selective variation of the serrations 22c with which the latch ridges 24d coact. Specifically, minimal decrease in the effective length of the leg assembly, to accommodate a relatively thick panel 12, may be achieved by engagement of the latch ridges 24d with upper latch serrations 22c; minimal expansion of the leg assembly diameter for coaction with an aperture 12a which is on the small side of production tolerances may be achieved by coaction of latch ridges 24d with upper serrations 22c; maximal decrease in the effective length of the leg assembly, to accommodate relatively thin panels, may be achieved by movement of the lever 24 to a pivoted position where the latch ridges 24d coact with lower serrations 22c; and maximal expansion of the leg assembly diameter to accommodate an oversized aperture 12a may be achieved by movement of the lever to a position where the latch ridges 24d coact with lower serrations 22c.

The attachment clip 50 of the second embodiment of the invention (FIGS. 10–12) is generally similar to the attachment clip 10 of the first embodiment with the exception that the lower end of the lever 52 has an eccentric configuration with respect to the pivot axis of the lever, the aperture 16g in the top face 16c of the flange is replaced by a series of slots 16h defining land portions 16i therebetween; and lugs 22d include elongated slots 22e lying generally on central axis 32.

The lower end 52b of lever 52 includes trunions 52c defining a lever pivot axis 54 and slidably received in the respective slots 22e in the lugs 22d, a main body portion 52f centered on pivot axis 54, and an eccentric or lobe portion 52g which is eccentric with respect to pivot axis 54.

The upper ends 26d, 28d of legs 26, 28 are journaled on shafts positioned on axis 54 and the upper end 30b of piston 30 is journalled on a shaft 56 that is offset with respect to pivot axis 54 and positioned between pivot axis 54 and lobe 52g.

Figure 10:
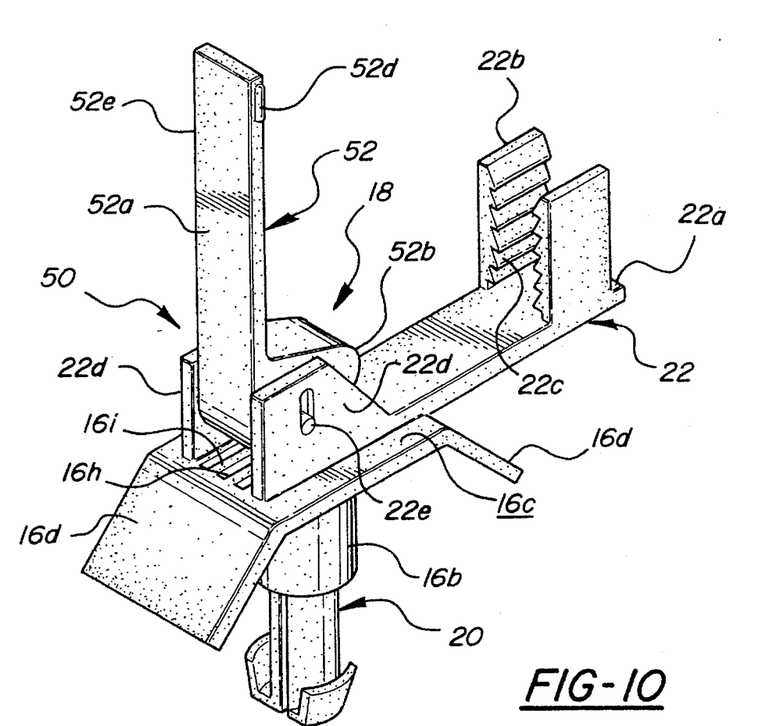
FIG. 10 is a perspective view of an attachment clip according to a second embodiment of the invention.
Figure 11:
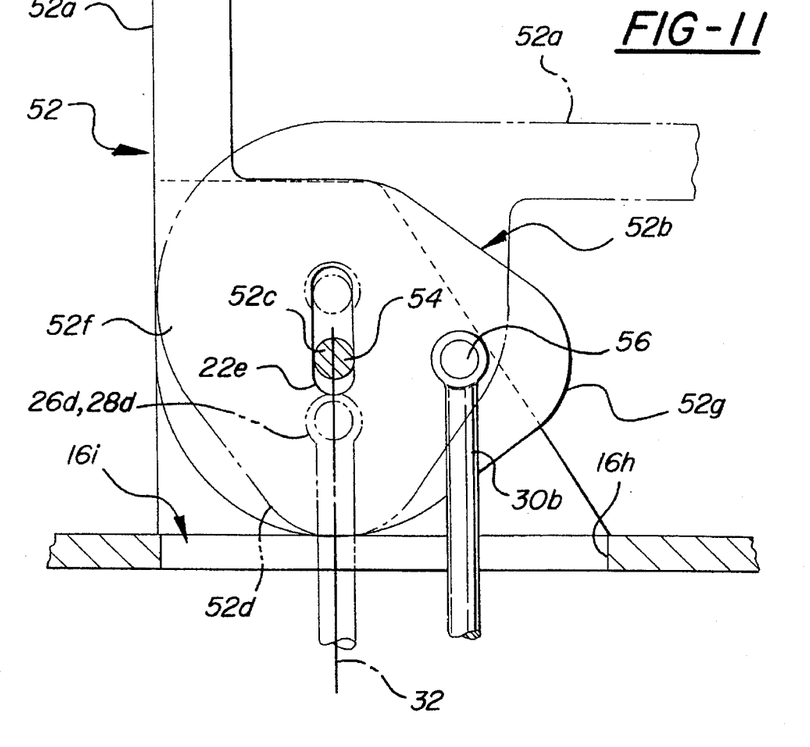
FIGS. 11 and 12 are detail views of the attachment clip of FIG. 10.
Figure 12:
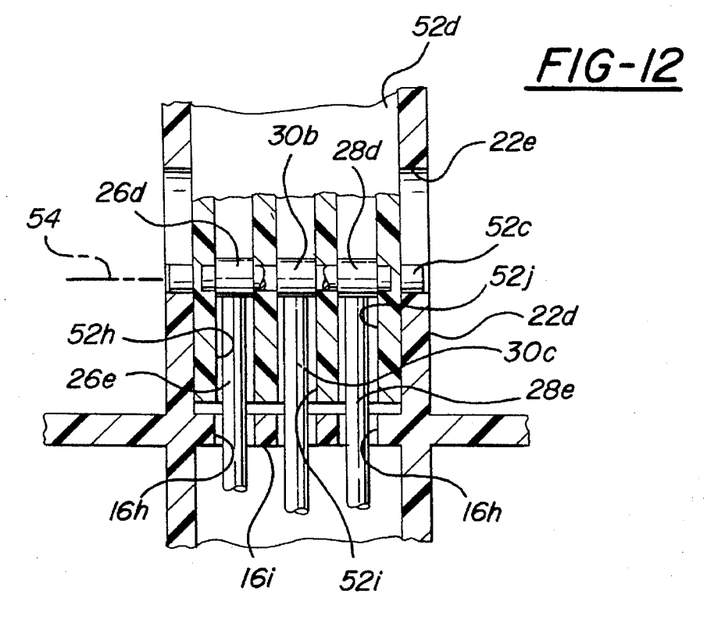

In the operation of the embodiment of FIGS. 10–12, as lever 52 is moved from an upright unlocked position as seen in FIG. 10 to a locked position in which the latch ridges 52d engage serrations 22c on the latch towers 22b, lobe 52g coacts with the upper surface 16c of the flange, as defined by the land portions 16i, to move trunions 52c gradually upwardly within slots 22e so as to gradually pull the legs 26, 28 upwardly and draw them into engagement with the underface 12b of the panel while, simultaneously, the movement of the piston 30 is controlled by the movement of shaft 56. The movement of shaft 56 is in turn determined by the eccentricity of shaft 56 relative to pivot axis 54 as compared to the eccentricity of the lobe 52g. Specifically, if the eccentricity of the shaft 56 is greater than the eccentricity of the lobe 52g the piston will undergo a net downward axial movement in response to pivotal movement of the lever; if the eccentricity of the shaft 56 is less than the eccentricity of the lobe 52g the piston will undergo a net upward axial movement in response to pivotal movement of the lever; and if the eccentricity of the shaft 56 equals the eccentricity of the lobe 52g the piston will under zero net axial movement in response to pivotal movement of the lever.

In any event, it is only necessary that the piston 30 and the legs 26, 28 undergo relative movement during the pivotal movement of the lever to accomplish the desired expansion of the effective diameter of the leg assembly and the parameters of the clip may be selected so as to ensure that the desired amount of relative axial movement between the piston and the legs occurs in response to pivotal movement of the lever irrespective of whether the piston undergoes a net downward movement, a net upward movement, or a net zero movement. It will be understood, as best seen in FIG. 12, that the upper ends of the legs and piston pass respectively through slots 16h in the wall 16c of the flange so that the land portions 16i defined therebetween may coact to define a surface for camming coaction with the lobe 52g to ensure the desired upward movement of the trunions 52c in the slots 22e in response to downward pivotal movement of the lever. 20 The arrangement of FIGS. 10–12 will be seen to optimize the upward movement of the legs for a given amount of pivotal movement of the lever so as to optimize the ability of the clip to accommodate panels of significantly varying thicknesses.

It will be understood that, in either disclosed embodiment of the invention, the enlarged lower end of the lever is suitably carved out to define passages 24f, g, and h (and 52h, i and j) to allow the required eccentric swinging movement of the upper ends of the arms and piston as the lever moves between unlocked and locked positions, and it will further be understood that sufficient slack and clearances are built into the total assembly to allow for the sometimes relatively angled disposition of the legs and piston as the assembly moves through its eccentric/reciprocal motions. Further, the upper ends 26e, 28e of the legs and the upper end 30c of the piston desirably have a thinner cross section, and/or are made of more flexible material, than the lower leg portions and the lower piston portion so as to flex as necessary to facilitate the movement of the assembly through its eccentric/reciprocal motions.

The invention attachment clip will be seen to have many important advantages. Specifically, since the effective diameter of the leg assembly, including the head portions 26a, 28a, may be dimensioned to pass through the aperture 12a with little or no interference, the insertion force required by the attachment clip is extremely low. Further, the invention attachment clip, by virtue of its ability to be selectively expanded in diameter, accommodates aperture size variations that are beyond usual tolerances. Further, by virtue of the ability of the leg assembly to be selectively decreased in effective length, the clip may be used even with panels having thicknesses beyond usual production tolerances. Further, since the leg assembly may be moved out of engagement with the panel simply by pivoting the lever upwardly to an unlocked position, the invention clip is totally reusable and may in fact be reused many times. Further, the locking arrangement whereby the lever is pivoted to a lowered position as the attachment clip locks against the panel provides a ready and easily discernable visual indication that the clip is in fact fully locked. Further, the attachment clip has the effect of separating the harness attachment action and the panel attachment action so that each action may be optimized without concern for impairing the other action.

Whereas preferred embodiments of the invention has been illustrated and described in detail, it will be apparent that various changes may be made in the disclosed embodiments without departing from the scope or spirit of the invention.

I claim:

1. An attachment clip for attaching a wire harness to a panel and including a body structure for engaging the wire harness to position the harness proximate one side face of the panel and an elongated leg assembly connected to the body structure, having a free end distal from the body structure, having a head structure on the distal free end, extending beyond the body structure by an effective length, and adapted to be passed through an aperture in the panel to dispose the head structure on the free end of the leg assembly proximate the other side face of the panel, characterized in that:

the leg assembly has a relaxed diameter and a relaxed effective length allowing the leg assembly to pass through the panel aperture to dispose the leg assembly head structure proximate the other side face of the panel; and the clip includes locking means carried by the body structure and operative when actuated to decrease the effective length of the leg assembly so as to draw the head structure against the other side face of the panel.

2. An attachment clip according to claim 1 wherein the locking means is further operative when actuated to increase the diameter of the leg assembly so as to expand the leg assembly into locking engagement with the panel aperture.

3. An attachment clip for attaching a wire harness to a panel and including a body for engaging the wire harness to position the harness proximate one side face of the panel and an elongated leg assembly connected to the body structure, having a free end distal from the body structure, having a head structure on the free end, extending beyond the body by an effective length, and adapted to be passed through an aperture in the panel to dispose the head structure on the free end of the leg assembly proximate the other side face of the panel, characterized in that:

the leg assembly has a relaxed diameter and a relaxed effective length allowing the leg assembly to pass readily through the panel aperture to dispose the leg assembly head structure proximate the other side face of the panel; and the clip includes locking means carried by the body and operative when actuated to increase the diameter of the leg assembly, whereby to expand the leg assembly into engagement with the panel aperture, and decrease the effective length of the leg assembly, whereby to draw the head structure against the other side face of the panel.

4. An attachment clip according to claim 3 wherein:

the leg assembly includes a plurality of legs spaced circumferentiatly about a central axis and defining the head structure, a piston mounted within the legs for movement along the central axis, and coacting means on the piston and on the legs operative to vary the diameter of the leg assembly in response to relative axial movement between the piston and the legs; and the locking means is operative when actuated to generate relative axial movement between the piston and the legs so as to increase the diameter of the leg assembly.

5. An attachment clip according to claim 4 wherein:

the locking means includes a lever and eccentric means operative in response to pivotal movement of the lever to generate relative axial movement between the piston and the legs.

6. An attachment clip according to claim 5 wherein:

the eccentric means is operative in response to pivotal movement of the lever to move the legs in one axial direction while moving the piston in an opposite axial direction.

7. An attachment clip according to claim 5 wherein:

the lever is mounted for movement between a locked position and an unlocked position; and the clip further includes latch means operative to retain the lever in its locked position.

8. An attachment clip for attaching a wire harness to a panel, the clip comprising:

a body structure for attaching the clip to the wire harness to position the harness in proximity to the panel and including a flange for embracing the wire harness and a hollow tower member extending from the flange for passage through the wire harness;

clip legs carried by the body structure, adapted to be inserted into an aperture in the panel, and normally closely spaced to allow ready passage of the legs through the panel aperture; and locking means mounted on the body structure and operative when actuated to expand the clip legs into engagement with the panel aperture.

9. A clip according to claim 8 wherein the clip includes a piston positioned between the clip legs and the locking means includes driving means operative to move the piston relative to the legs to separate the clip legs.

10. A clip according to claim 9 wherein the driving means includes a lever pivotally mounted on the body structure.

11. An attachment clip according to claim 10 wherein the driving means further includes eccentric means operative in response to pivotal movement of the lever.

12. An attachment clip according to claim 8 wherein the clip legs pass through the tower member.

13. An attachment clip according to claim 8 wherein the locking means further includes a lever base formed rigid with the body structure and coacting latch means on the lever and on the lever base operative to maintain the lever in a locked position.

14. An attachment clip according to claim 1 wherein:

the body structure includes means mounting the leg assembly for axial movement and an axially extending slot;

the locking means includes a lever having a pivot pin proximate one end thereof slidably received in the slot and defining a pivot axis for the lever;

the leg assembly includes at least one leg defining the leg assembly head structure at one end thereof;

another end of the leg is attached to the lever; and said one end of said lever defines a cam structure eccentric with respect to the pivot axis and operative in response to pivotal movement of the lever about its pivot axis to move the pivot pin slidably in the slot in a direction to draw the leg assembly head structure against the other side face of the panel.

15. An attachment clip according to claim 14 wherein the other end of the leg is attached to the lever at the pivot axis of the lever.

16. An attachment clip according to claim 15 wherein:

the leg assembly includes a central piston connected to the lever, a plurality of legs spaced circumferentially about the piston and connected at their other ends to the lever at the pivot axis of the lever and coacting means on the piston and legs operative in response to relative axial movement between the piston and the legs to vary the effective diameter of the leg assembly; and the piston and legs undergo relative axial movement in response to pivotal movement of the lever whereby to increase the effective diameter of the leg assembly and expand the leg assembly into engagement with the panel aperture.

17. An attachment clip according to claim 16 wherein the piston is connected to the lever at a location that is offset from the lever pivot axis whereby to impart a cranking movement to the piston in response to pivotal movement of the lever.

18. An attachment clip for attaching a wire harness to a panel, the clip comprising:

a body structure for attaching the clip to the wire harness to position the harness in proximity to the panel;

clip legs carried by the body structure, adapted to be inserted into an aperture in the panel, normally closely spaced to allow ready passage of the legs through the panel aperture, and each including a head structure at a free end thereof; and a piston positioned between the clip legs;

locking means mounted on the body structure and including a lever pivotally mounted on the body structure and eccentric means operative in response to pivotal movement of the lever to move the piston relative to the clip legs to expand the clip legs into engagement with the panel aperture and move the clip legs in a direction to draw the head structures of the clip legs into engagement with the panel.

19. An attachment clip for attaching a wire harness to a panel utilizing an aperture in the panel, the clip comprising:

a body structure for attaching the clip to the wire harness;

a lever having a lever base mounted on the body structure for rotary movement about a horizontal axis to allow movement of the lever between locked and unlocked positions;

a plurality of elongated legs extending downwardly from the lever base, spaced circumferentially about a generally vertical central axis, and each pivotally attached at an upper end thereof to the lever base for movement about a horizontal leg axis;

an elongated piston positioned centrally within the circumferentially spaced legs and pivotally attached at an upper end thereof to the lever base for movement about a horizontal piston axis spaced from the leg axis, whereby rotary movement of the lever between its locked and unlocked positions generates relative movement of the legs and piston along the central axis; and coacting means on said piston and on said legs operative in response to relative movement of the legs and pistons along the central axis to vary an effective diameter of the legs, whereby the legs may be inserted into the panel aperture in a relaxed diameter and the lever may be moved from its unlocked to its locked position to increase the effective diameter of the legs and move the legs into locking engagement with the panel aperture.

* * * * *